United States Patent
Olshefski

(10) Patent No.: US 7,496,036 B2
(45) Date of Patent: Feb. 24, 2009

(54) METHOD AND APPARATUS FOR DETERMINING CLIENT-PERCEIVED SERVER RESPONSE TIME

(75) Inventor: David P. Olshefski, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 10/994,878

(22) Filed: Nov. 22, 2004

(65) Prior Publication Data

US 2006/0168240 A1 Jul. 27, 2006

(51) Int. Cl.
*H04L 1/00* (2006.01)

(52) U.S. Cl. .................. 370/235; 370/245; 370/252; 703/203

(58) Field of Classification Search ............... 370/204, 370/352, 235, 203, 245, 252; 709/224, 203
See application file for complete search history.

(56) References Cited

U.S. PATENT DOCUMENTS

| | | | | | |
|---|---|---|---|---|---|
| 6,041,352 | A | * | 3/2000 | Burdick et al. ............. | 709/224 |
| 6,757,255 | B1 | * | 6/2004 | Aoki et al. ................. | 370/252 |
| 7,007,092 | B2 | * | 2/2006 | Peiffer ....................... | 709/227 |
| 7,065,482 | B2 | * | 6/2006 | Shorey et al. .............. | 709/224 |
| 7,143,184 | B1 | * | 11/2006 | Shah et al. ................. | 709/241 |
| 7,299,280 | B2 | * | 11/2007 | Gerla et al. ................ | 709/224 |
| 7,313,627 | B1 | * | 12/2007 | Noble ......................... | 709/233 |
| 7,330,426 | B2 | * | 2/2008 | Berzosa et al. ............. | 370/229 |
| 7,363,367 | B2 | * | 4/2008 | Lloyd et al. ................ | 709/224 |

OTHER PUBLICATIONS

Olshefski, et al., "Using Certes to Infer Client REsponse Time at the Web Server," ACM Transactions on Computer Systems, vol. 22, Issue 1 (Feb. 2004) pp. 49-93.

* cited by examiner

*Primary Examiner*—Ricky Ngo
*Assistant Examiner*—Dewanda Samuel

(57) ABSTRACT

One embodiment of the present method and apparatus for determining client-perceived server response time enables a user to accurately measure client-perceived server response time in the presence of packet loss. In one embodiment, the inventive method includes capturing a copy of a first packet traversing a computing network between a client and a server and modifying a server-measured transaction start time to account for a number of packets captured and inferred prior to capturing the first packet. Modifying the server-measured response time in this manner enables the server-measured response time to more accurately reflect the client-perceived server response time, thereby allowing for more accurate assessment of service level agreements, client satisfaction, provisioning and the like.

14 Claims, 10 Drawing Sheets

METHOD AND APPARATUS FOR
DETERMINING CLIENT-PERCEIVED
SERVER RESPONSE TIME

BACKGROUND

The present invention relates generally to computing networks, and relates more particularly to determination of server response time in computing networks.

FIG. 1 is a schematic diagram illustrating a typical computing network 100. Network 100 comprises one or more clients $102_1$-$102_n$ (hereinafter referred to as "clients 102") communicating with a server 106 via a network (e.g., an internet) 104. The server 106 executes transactions at the request of the clients 102, e.g., according to a specific application.

One of the most important metrics by which server performance is measured is the time that the server 106 takes to respond to client requests. Accurate measurement of server response time, as perceived by the clients 102, is essential for monitoring service-level agreements, client satisfaction, provisioning, and the like. However, it is difficult to implement conventional methods for determining client-perceived server response time in a manner that provides accurate measurement in a timely manner. For example, conventional methods typically measure only a portion of the total server response time (e.g., they do not account for delays due to connection setup, waiting in kernel queues, web objects residing outside of the server 106, or other network problems that might affect client-perceived response time), or they are unusable for real-time analysis of large log files (e.g., as when the analysis is performed offline). Other methods, while more timely and more generally accurate, do not account for packet loss, which can affect client-perceived server response time, nor do they work under high-speed packet streams.

Thus, there is a need in the art for a method and apparatus for determining client-perceived server response time.

SUMMARY OF THE INVENTION

One embodiment of the present method and apparatus for determining client-perceived server response time enables a user to accurately measure client-perceived server response time in the presence of packet loss. In one embodiment, the inventive method includes capturing a copy of a first packet traversing a computing network between a client and a server and modifying a server-measured transaction start time to account for a number of packets inferred (but not captured) prior to capturing the first packet. Modifying the server-measured response time in this manner enables the server-measured response time to more accurately reflect the response time as perceived by the client, thereby allowing for more accurate assessment of service level agreements, client satisfaction, provisioning and the like.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for determining client-perceived server response time. Embodiments of the present invention enable a server to assess the time that the server takes to respond to a client request, as perceived by the client. In one embodiment, a packet capture system is implemented in the network and assists in the determination of client-perceived server response time by accounting for delays not necessarily perceived by the server, e.g., including delays related to packet loss.

Figure 2:
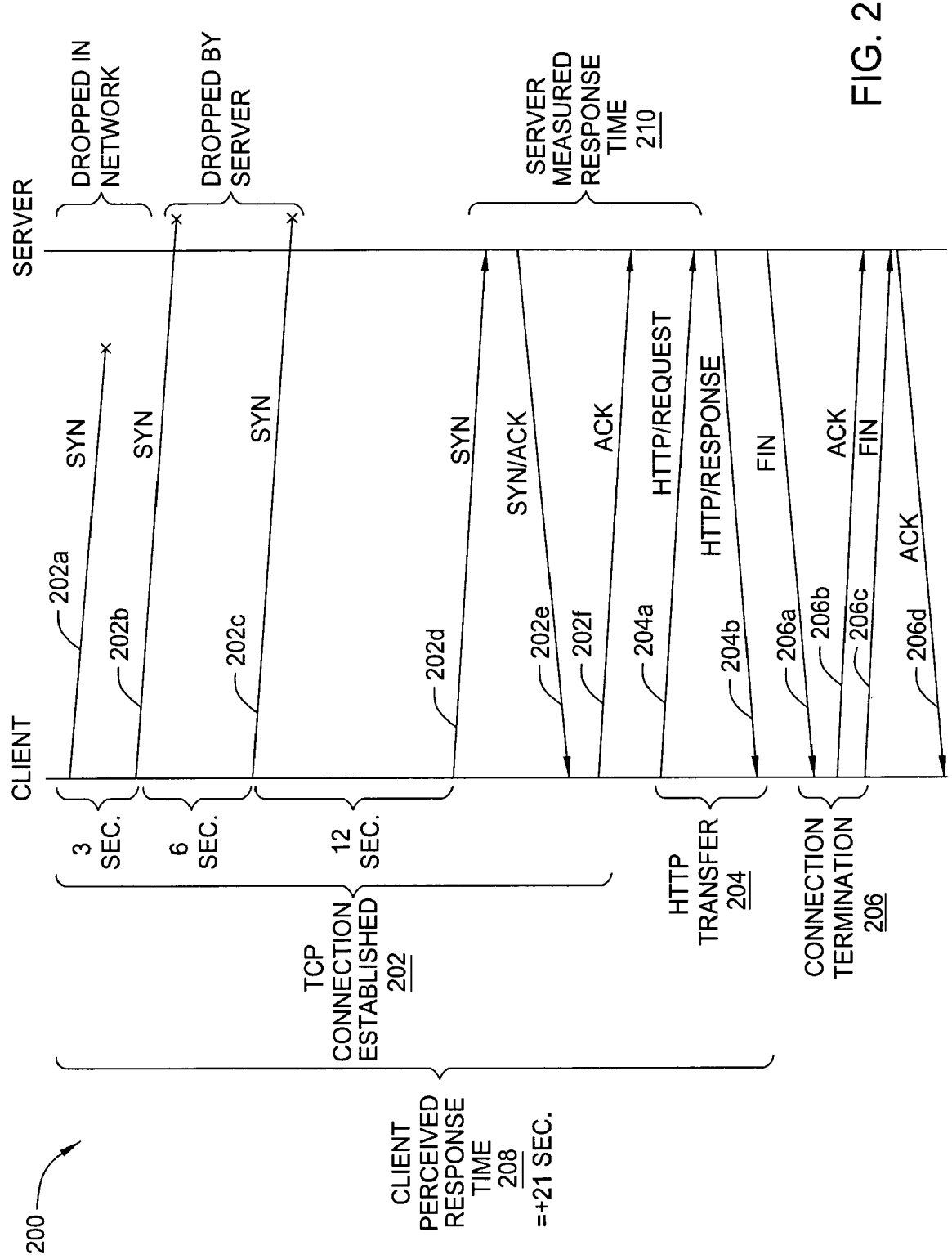
FIG. 2 is a diagram illustrating a typical transport control protocol/hypertext transfer protocol (TCP/HTTP) transaction between a client and a server, in which one or more packets conveying a TCP connection request are dropped.

FIG. 2 is a diagram illustrating a typical transport control protocol/hypertext transfer protocol (TCP/HTTP) transaction 200 between a client and a server, in which one or more packets conveying a TCP connection request are dropped. A TCP connection 202 is established between the client and the server according to known TCP procedures by executing a "three-way handshake". Specifically, the client sends an initial TCP connection request packet 202d (e.g., a "SYN" packet) to the server, requesting a TCP connection. The server responds to the initial TCP connection request packet 202d by sending a second packet 202e (e.g., a "SYN/ACK" packet) back to the client acknowledging the connection request. The client then sends a third packet 202f (e.g., an "ACK" packet) back to the server acknowledging the packet destination (e.g., the server), thereby establishing an open TCP connection 202 between the client and the server.

Once the open TCP connection 202 is established, the client and server may execute a transaction, e.g., an HTTP transfer 204, over the TCP connection 202. Specifically, the client sends an HTTP request 204a to the server (e.g., requesting a web object or data), and the server sends an HTTP response 204b including the requested object back to the client. Several such HTTP transfers may occur over the open TCP connection 202 until either the client or the server terminates the TCP connection 202. In the illustrated example, the server terminates the TCP connection 202 by sending a first TCP connection termination packet (e.g., "FIN" packet 206a) to the client and then receiving a second TCP connection termination packet (e.g., "ACK" packet 206b) from the client acknowledging the TCP connection termination. The client then sends a third TCP connection termination packet (e.g., "FIN" packet 206c) to the server, which the server acknowledges with a fourth TCP connection termination packet (e.g., "ACK" packet 206d), thereby terminating the TCP connection. Alternatively, the client may initiate TCP connection termination in a similar manner.

As illustrated, one or more client attempts to establish TCP connection 202 may fail if an initial TCP connection request packet is dropped in the network (e.g., "SYN" packet 202a) or is dropped by the server (e.g., "SYN" packets 202b and 202c). Typically, a client will wait a predefined amount of time (e.g., three seconds) for server acknowledgement (e.g., "SYN/ACK" packet 202e) of the initial TCP connection request packet. If no acknowledgement is received, the client assumes that the initial TCP connection request packet has been dropped, and the client attempts to resend the initial TCP connection request packet (e.g., packet 202b). The client will then typically double the retransmission wait time applied to the previous initial TCP connection request packet (e.g., to six seconds) for server acknowledgment of the second attempt. If the server still fails to respond to the initial TCP connection request packet (e.g., packet 202b), the client continues to resend the initial TCP connection request packet, doubling the previous initial TCP connection request packet's retransmission wait time with each renewed attempt (e.g., so that each successive retransmission wait time increases to twelve seconds, twenty-four seconds, etc.). In some cases, the client will cancel the attempted transaction (e.g., will cease to resend initial TCP connection request packets) after the expiration of a predefined cumulative wait period or after a predefined maximum number of initial request TCP connection packets are sent. This process of resending initial TCP connection request packets and adjusting retransmission wait times for server response is referred to as an "exponential backoff mechanism".

Packet loss in instances such as that illustrated in FIG. 2 has a significant effect on the client-perceived server response time 208. A client measures server response time to start when the first initial TCP connection request packet (e.g., packet 202a) is sent to the server and to end when the HTTP transfer 204 is completed (e.g., through HTTP response 204b). Thus, any failed attempts to establish a TCP connection (e.g., packets 202a-202c) will increase client-perceived server response time. For example, in the illustrated transaction, the server response time, as perceived by the client, adds twenty-one seconds (i.e., the sum of the accumulated wait periods that expire before an initial TCP connection request packet, e.g., packet 202d, is acknowledged by the server) to the time consumed by the HTTP transfer 204.

However, the response time as measured by the server starts when the server receives an initial TCP request packet that is not dropped (e.g., packet 202d) and ends when the HTTP transfer 204 is completed (e.g., through HTTP response 204b). The server is either not aware of or ignores (i.e., does not log or track) any initial TCP connection request packets that were dropped (e.g., packets 202a-202c) before the successful initial TCP connection request packet 202d arrived. Thus, the server-measured response time 210 may differ significantly from the client-perceived response time 208 (in this case, by a margin of twenty-one seconds). This difference in perceived server response time can have a dramatic impact on the assessment of client satisfaction, service level agreements and the like.

Figure 1:
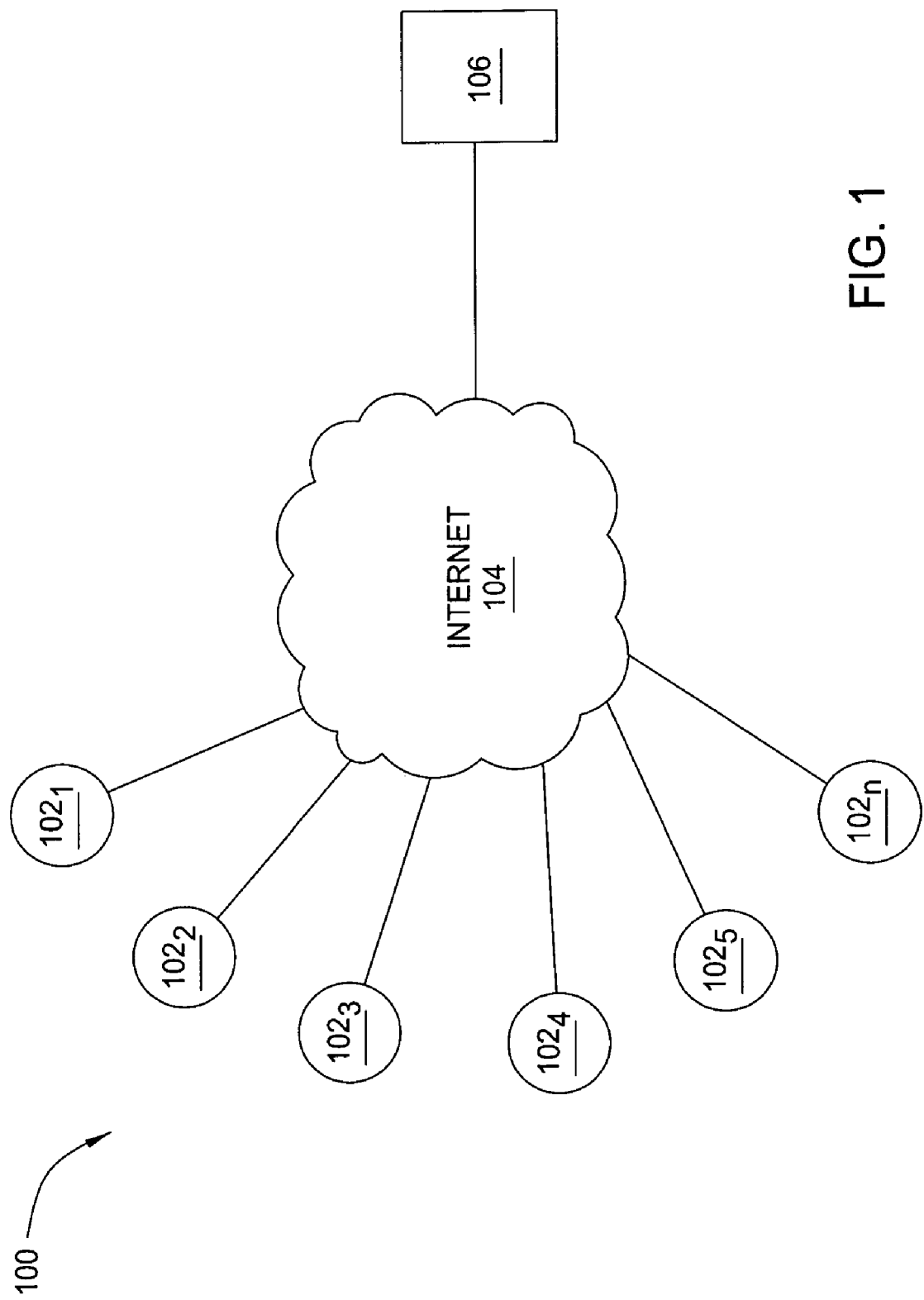
FIG. 1 is a schematic diagram illustrating a typical computing network.
Figure 3:
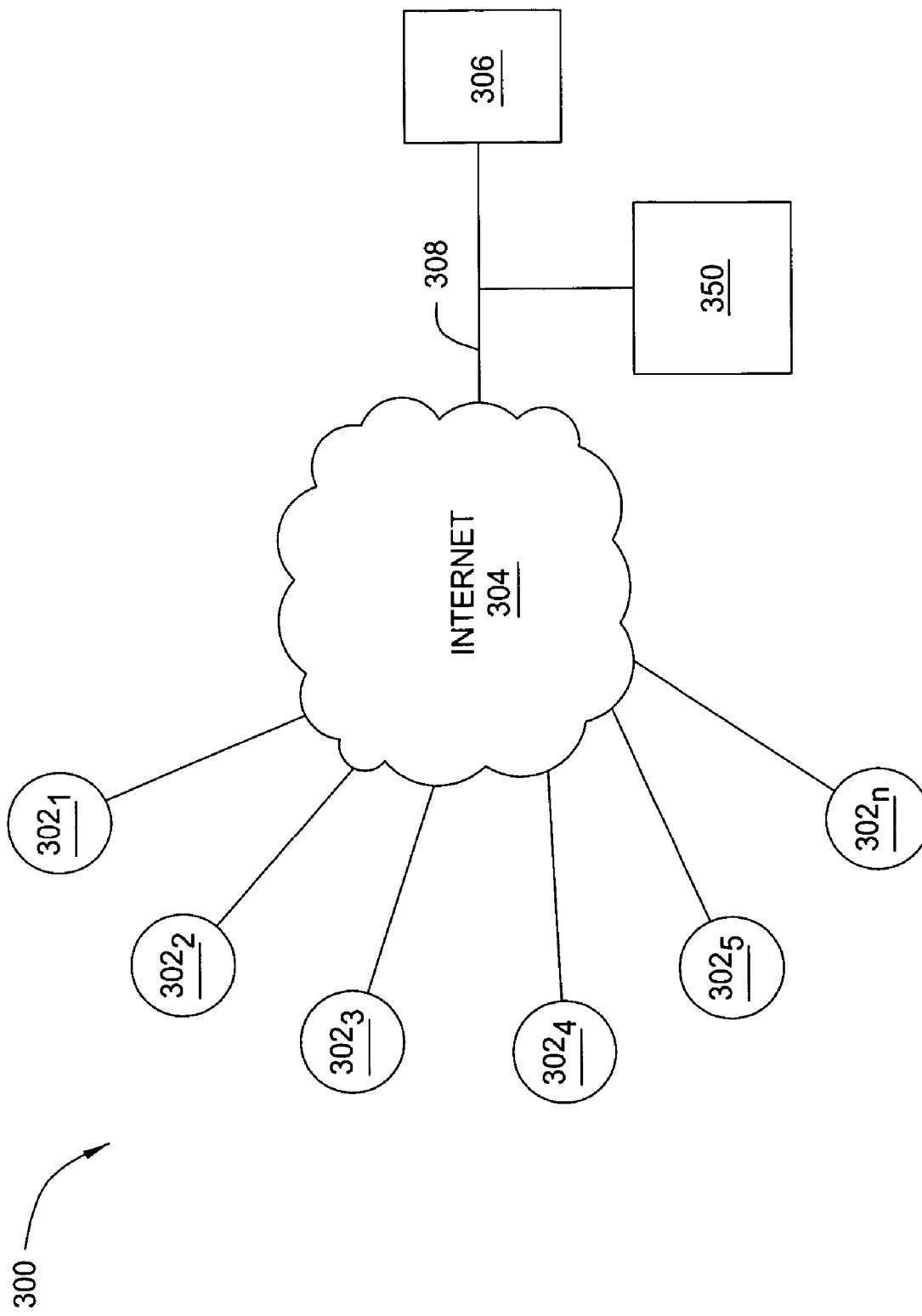
FIG. 3 is a schematic diagram illustrating one embodiment of a computing network adapted for measuring client-perceived server response time, according to the present invention.

FIG. 3 is a schematic diagram illustrating one embodiment of a computing network 300 adapted for measuring client-perceived server response time, according to the present invention. Network 300 is substantially similar to the network 100 of FIG. 1 and comprises one or more clients $302_1$-$302_n$ (hereinafter referred to as "clients 302") communicating with a server 306 via a network (e.g., an internet) 304. In addition, the network 300 further comprises a packet capture system 350. The packet capture system 350 is coupled to a communication channel 308 that connects the server 306 to the internet 304. The architecture of the network 300 is thus configured so that a copy of every packet sent to and from the server (e.g., over the internet 304) is sent to the packet capture system 350.

The packet capture system 350 comprises a system that is configured to determine client-perceived response time by analyzing passively captured packet streams. In one embodiment, the packet capture system 350 is characterized by a "look once at each packet" analysis approach in which a copy of each packet sent to or from the server 306 is parsed once and used to reconstruct the behavior of the TCP and HTTP protocols within the packet stream.

Under conditions of zero packet loss, the packet capture system 350 determines client-perceived server response time as:

$$(t_f - t_i) + RTT \tag{EQN. 1}$$

where $t_i$ is the time at which an initial TCP connection request packet is captured by the packet capture system 350, $t_f$ is the time at which a last packet of an HTTP response (e.g., en route from the server 306 to a client 302) is captured by the packet capture system 350, and RTT is one round trip time from a client 302 to the server 306 and back to the client 302. One RTT is added because it takes ½ RTT for the initial TCP connection request packet to traverse the network 300 from the client 302 to the server 306, and it takes ½ RTT for the last packet of the HTTP response to traverse the network 300 from the server 306 to the client 302. Thus, assuming network delay is approximately the same in both directions, one RTT is the difference between the server-measured response time (which is approximately $t_f - t_i$) and the client-perceived server response time.

Determination of client-perceived server response time is more difficult in cases where one or more packets involved in a transaction are lost by the server 306 or within the network 300 (e.g., initial request packets 202a-c in FIG. 2). The packet capture system 350 is positioned so that the packet capture system 350 should receive copies of all packets that reach the server 306, including packets that are dropped by the server 306 (e.g., packet 202b and 202c). Moreover, even in cases where packets are dropped in the network 300 and never reach the server 306 (e.g., packet 202a), the packet capture system 350 is configured to infer the existence of such packets, even though copies of the packets are never captured by the packet capture system 350. In such cases, the packet capture system 350 determines the client-perceived server response time by inferring the existence of lost packets to adjust the client-perceived transaction start time accordingly, as described in further detail below.

Figure 4:
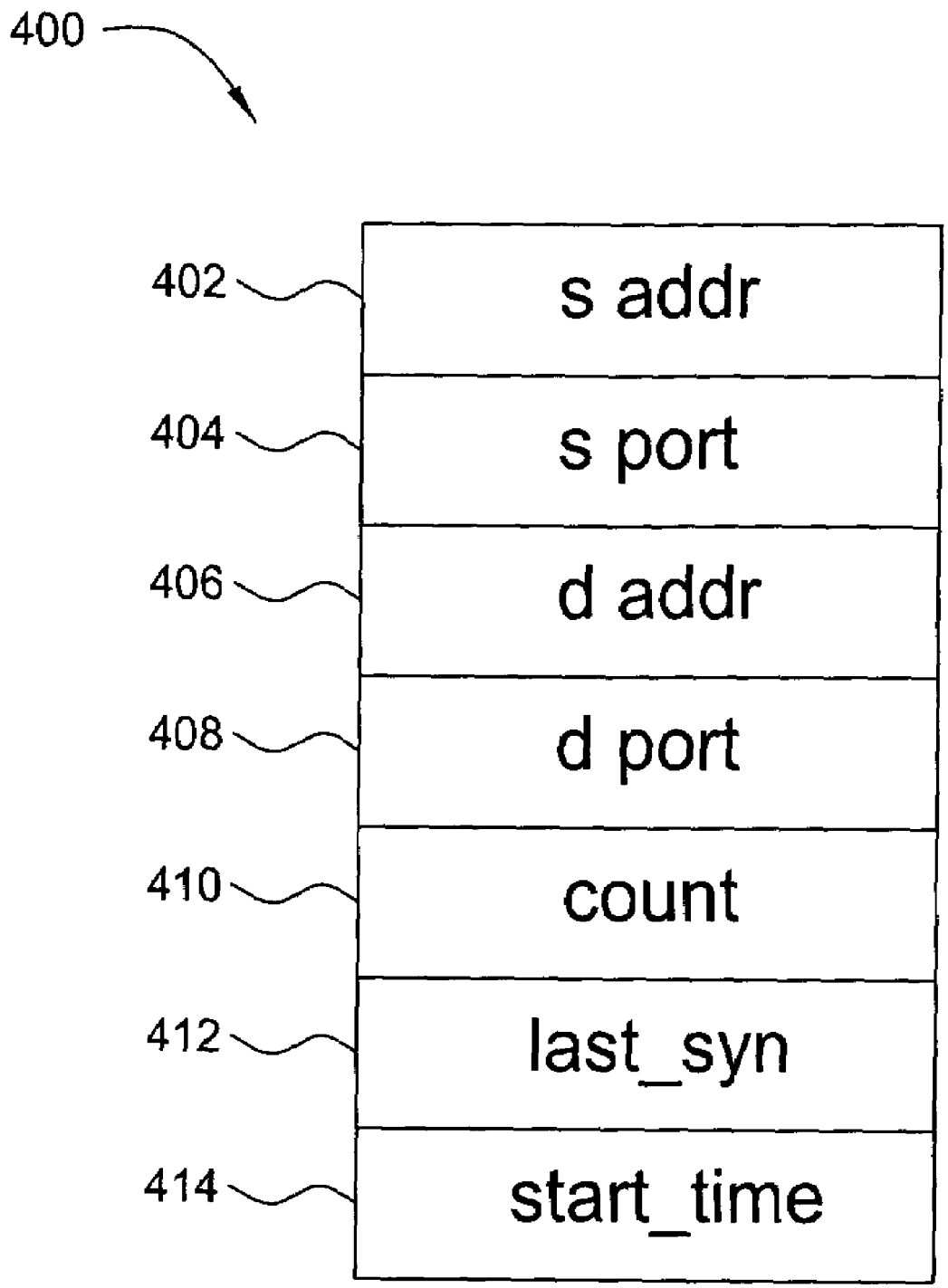
FIG. 4 illustrates a flow object representing a TCP connection between a remote client and a server.

FIG. 4 illustrates a flow object 400 representing a TCP connection between a remote client (e.g., a client 302) and a server (e.g., server 306). In one embodiment, the flow object 400 includes seven fields 402-414 that describe the TCP connection. Specifically, the "s addr" field 402 is set to the IP address of the client 302; the "s port" field 404 is set to the port number of the client 302; the "d addr" field 406 is set to the IP address of the server 306; the "d port" field 408 is set to the port number of the server 306; the "count" field 410 is set to the number of initial TCP connection request packets (e.g., SYN packets 202a-d in FIG. 2) sent from the client to the server and inferred or captured by a packet capture system (e.g., packet capture system 350); the "last_syn" field 412 is set to the time at which the last initial TCP connection request packet sent from the client 302 to the server 306 was captured by the packet capture system 350; and the "start_time" field is set to the start time of the transaction (e.g., transaction 200 of FIG. 2), as perceived by the server 306.

Figure 5:
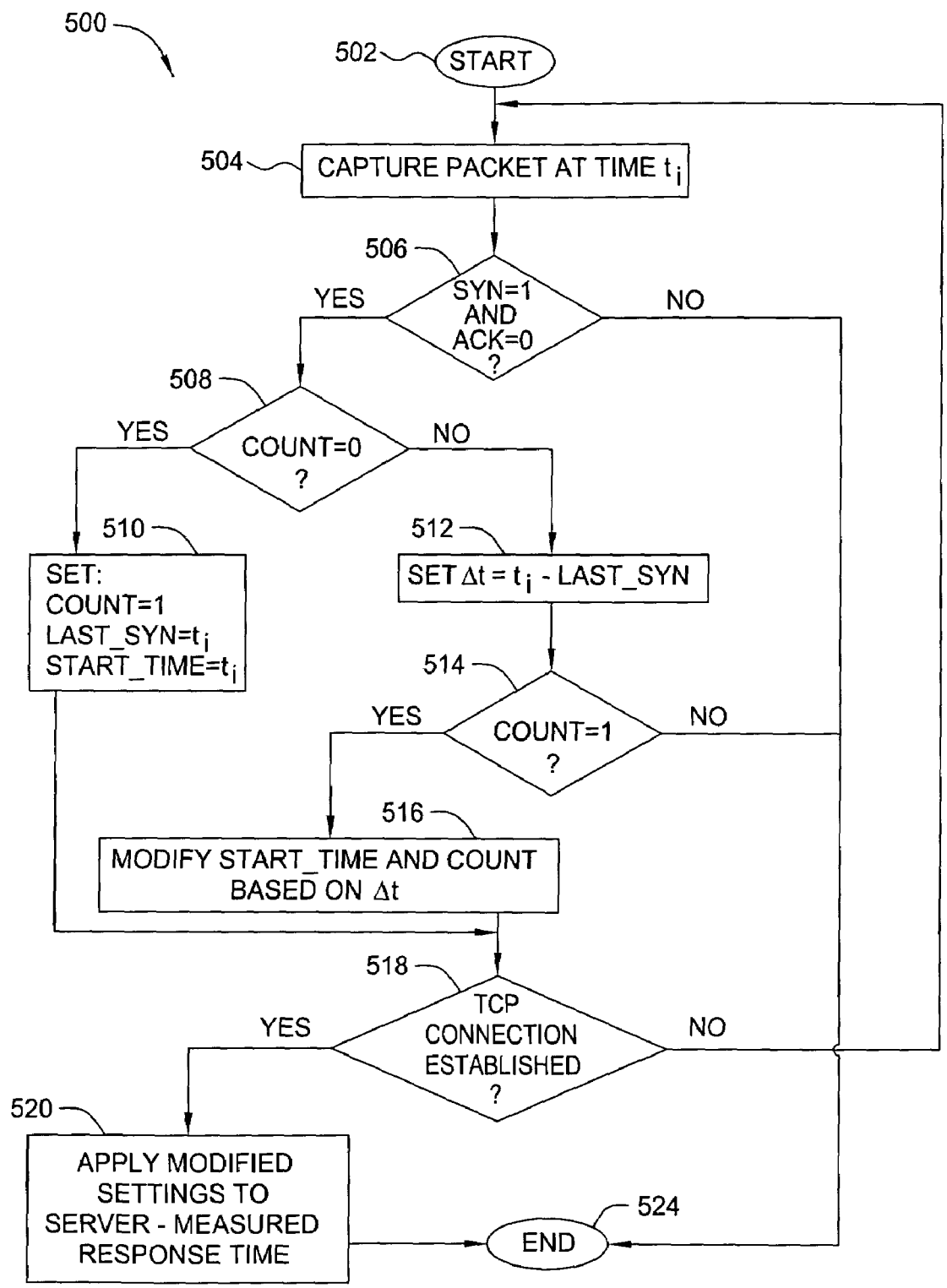
FIG. 5 is a flow chart illustrating one embodiment of a method 500 for determining client-perceived server response time, according to the present invention.

FIG. 5 is a flow chart illustrating one embodiment of a method 500 for determining client-perceived server response time, according to the present invention. The method 500 may be implemented with a system such as the network 300 of FIG. 3, including packet capture system 350. The method 500 is initialized at step 502 and proceeds to step 504, where the method 500 captures an initial TCP connection request packet at time $t_i$. In step 506, the method 500 examines the header of the captured packet. Specifically, the method 500 asks whether TCP flags in the header are set to SYN=1 and ACK=0, indicating that the associated packet is an initial request packet for a TCP connection. If the flags are not set in such a way, the method 500 proceeds to step 524 and terminates (e.g., if SYN=0, this would indicate that a TCP connection is already established and the packet might be, for example, an HTTP packet).

If the method 500 concludes in step 506 that the TCP flags in the header of the captured packet are set to SYN=1 and ACK=0, the method 500 proceeds to step 508 and inquires whether the count field (e.g., field 410 in FIG. 4) in a flow object representing the TCP connection to which the captured packet belongs is set to zero. A count field set to zero would indicate that no other initial TCP connection request packets have been captured or inferred by the packet capture system 350, and thus presumably the packet captured in step 504 is the only initial TCP connection request packet sent from the client 302 to the server 306.

If the method 500 concludes in step 508 that the count field in the flow object representing the TCP connection to which the captured packet belongs is set to zero (e.g., that the captured packet is the first and thus far only initial TCP connection request packet sent from the client 302 to the server 306), the method 500 proceeds to step 510 and adjusts the corresponding flow object accordingly. In one embodiment, the count field is set to one (e.g., indicating that the packet capture system 350 has captured or inferred one packet, the packet captured in step 504); the last-syn field is set to $t_i$ (e.g., indicating that the time at which the last initial TCP connection request packet—in this case the packet captured in step 504—was captured corresponds to the start time of the method 500 at $t_i$); and the start_time field is set to $t_i$ (e.g., indicating that the start time for the TCP/HTTP transaction is the time at which the captured packet was captured). Essentially, the values in the count, last_syn and start_time fields all indicate that the packet captured in step 504 is the first and only initial TCP connection request packet sent from the client 302 to the server 306, and thus, presumably, no other packets have been dropped as of step 504.

Alternatively, if the method 500 concludes in step 508 that the count field in the flow object representing the TCP connection to which the captured packet belongs is not set to zero (e.g., that the captured packet is not the first or only initial TCP connection request packet sent from the client 302 to the server 306), the method 500 proceeds to step 512 and sets $\Delta t = t_i - $ last_syn, where $\Delta t$ is the time that has elapsed between the capture of the current initial TCP connection request packet and the capture of an immediately prior initial TCP connection request packet. The associated retransmission wait time, $\Delta t$, can be used to infer how many failed initial TCP connection request packets have previously been sent to the server 306, and how much time has elapsed including retransmission wait times between two or more initial TCP connection request packets, as described in further detail below.

In step 514, the method 500 inquires if the count field in the flow object representing the TCP connection to which the captured packet belongs is set to one (e.g., indicating that at least one initial TCP connection request packet has been captured or inferred by packet capture system 350 prior to the captured packet). If the count field is set to one, the method 500 proceeds to step 516 and modifies the associated flow object in order to adjust the perceived transaction start time. Specifically, the method 500 modifies the start_time and count fields, based on the associated $\Delta t$. Alternatively, if the method 500 determines in step 514 that the count field is not set to one, the method proceeds to step 524 and terminates (e.g., if the count field is set to a value greater than one, this may indicate that some logic was already performed in an effort to track initially missed time).

Figure 6:
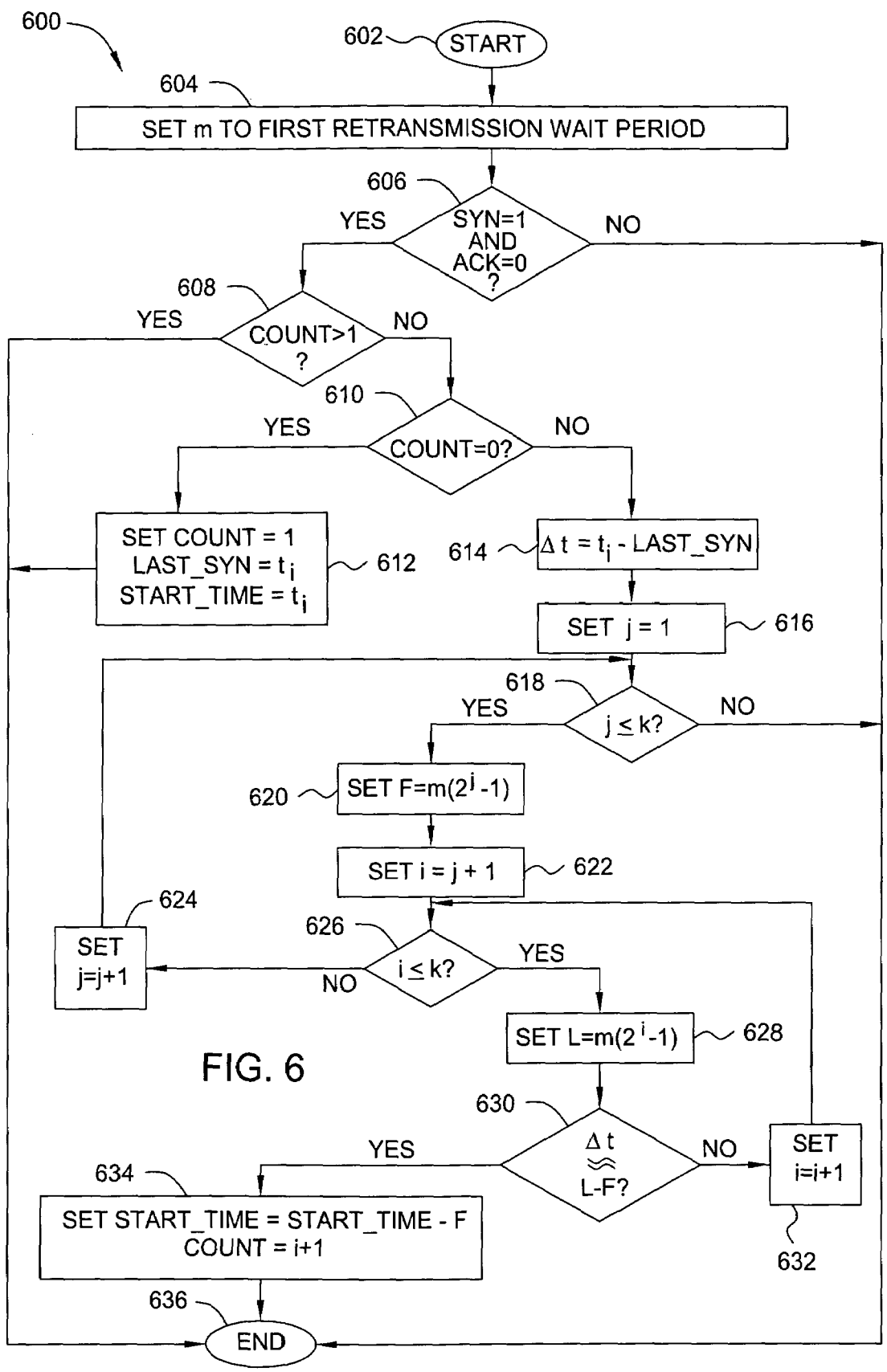
FIG. 6 is a flow diagram illustrating one embodiment of a method for modifying fields of a flow object representing a TCP connection to which a captured packet belongs, in accordance with the method illustrated in FIG. 5.

FIG. 6 is a flow diagram illustrating one embodiment of a method 600 for modifying the start_time and count fields of a flow object representing a TCP connection to which a captured packet belongs, e.g., in accordance with step 516 of the method 500. The method 600 is initialized at step 602 and proceeds to step 604, where the method 600 sets m to the first retransmission wait period. In many cases, m will be equal to three; however, m may have other values as well.

In step 606, the method 600 inquires if flags in the captured packet's TCP header are set to SYN=1 and ACK=0, e.g., indicating that the associated packet is an initial request packet for a TCP connection. If SYN is not set to one and/or ACK is not set to zero, the method 600 proceeds to step 636 and terminates. Alternatively, if the method 600 determines that SYN=1 and ACK=0, the method 600 proceeds to step 608 and inquires if a value in the count field of the captured packet's flow object is greater than one, e.g., indicating that at least two other initial TCP connection request packets have been captured or inferred by the packet capture system 350.

If the method 600 determines that the count field is set to a value that is greater than one, the method 600 terminates in step 636. Alternatively, if the count field is not set to a value that is greater than one, the method 600 proceeds to step 610 and inquires if the count field is set to zero, e.g., indicating that no other initial TCP connection request packets have been captured or inferred by the packet capture system 350, and thus presumably the captured packet is the only initial TCP connection request packet sent from the client 302 to the server 306.

If the count field is set to zero, the method 600 proceeds to step 612 and sets the count field to one. The method 600 also sets the last_syn field equal to $t_i$ and sets the start_time field equal to $t_i$. The method 600 then terminates in step 636.

Alternatively, if the method 600 determines in step 610 that the count field is not set to zero (e.g., indicating that one previous initial TCP connection request packet has been captured or inferred by the packet capture system 350) the packet captured, the method 600 proceeds to step 614 and sets Δt equal to $t_i$−last_syn. The method 600 then proceeds to step 616 and sets j equal to one, where j represents a number of times that the captured packet has previously been sent (and re-sent) by the originating client 302 (not including the captured packet currently under analysis).

In step 618, the method inquires if j is less than or equal to k, where k represents a predefined maximum number of times that a client will attempt to send (and re-send) an unanswered packet. In one embodiment, k is user-definable. If j is not less than or equal to k, the method 600 terminates in step 636. However, if j is less than or equal to k, the method 600 proceeds to step 620 and sets $F=m(2^j-1)$. In step 622, the method 600 sets i=j+1.

The method 600 then proceeds to step 626 and inquires if i is less than or equal to k. If i is not less than or equal to k, the method 600 proceeds to step 624 and sets j=j+1 (i.e., increases the original j's value by one). The method 600 then returns to 618 and proceeds as described above.

Alternatively, if the method 600 determines that i is not less than or equal to k, the method 600 proceeds to step 628 and sets $L=m(2^i-1)$, where L represents a cumulative period of time in which packets may have been dropped or missed (e.g., a length of time elapsed between the sending of the first TCP request packet and the capture of the last TCP request packet). The method 600 then proceeds to step 630 and inquires if Δt is approximately equal to L−F. If Δt is not approximately equal to L−F, the method 600 proceeds to step 632 and sets i=i+1 (e.g., increases the original i's value by one). The method 600 then returns to step 626 and proceeds as described above.

Alternatively, if the method 600 determines that Δt is approximately equal to L−F, the method proceeds to step 634 and sets the start_time field in the captured packet's flow object to start_time−F. In addition, the count field of the flow object is set to i+1. The method 600 then terminates in step 636.

Referring back to FIG. 5, in one embodiment, if the method 500 calculates Δt to be approximately six seconds in step 512, then in step 516, the method 500 sets start_time to start_time−3 seconds (e.g., inferring that an initial TCP connection request packet having a retransmission wait time of three seconds was sent prior to the packet captured at $t_i$, having a retransmission wait time of approximately six seconds). Thus, the method 500 essentially adds three seconds to the response time as currently perceived by the server 306, so that the response time as perceived by the server 306 reflects the response time as perceived by the remote client 302 attempting to connect to the server 306. In addition, the method 500 sets the count field to three, indicating that a total of three initial TCP connection request packets (including the packet captured at $t_i$) have been sent to the server 306: a first initial TCP connection request packet sent at the start of the transaction (e.g., start_time), a second packet sent three seconds later, and a third packet (e.g., the packet captured at $t_i$) sent six seconds later. This logic is verified by referring back to FIG. 2, where initial TCP connection request packet 202c, having a retransmission wait time of six seconds, is the third initial TCP connection request packet sent to the server (e.g., after initial TCP connection request packets 202a and 202b). In this case, adding three seconds (e.g., the time elapsed between the transmission of packet 202a and the transmission of packet 202b) to the retransmission wait time of six seconds produces a more accurate assessment of the client-perceived server response time.

The following paragraphs illustrate some specific examples of modifications that the method 500 may make, based on a given set of captured information. For example, in one embodiment, if the method calculates Δt to be approximately twelve seconds in step 512, then in step 516, the method 500 sets start_time to start_time−9 seconds (e.g., essentially adding nine seconds to the response time as currently perceived by the server 306). In addition, the method 500 sets the count field to four, indicating that a total of four initial TCP connection request packets, including the packet captured at $t_i$, have been sent to the server 306.

In another embodiment, if the method calculates Δt to be approximately eighteen seconds in step 512, then in step 516, the method 500 sets start_time to start_time−three seconds (e.g., essentially adding three seconds to the response time as currently perceived by the server 306). In addition, the method 500 sets the count field to four, indicating that a total of four initial TCP connection request packets, including the packet captured at $t_i$, have been sent to the server 306.

In another embodiment, if the method calculates Δt to be approximately twenty-four seconds in step 512, then in step 516, the method 500 sets start_time to start_time−21 seconds (e.g., essentially adding twenty-one seconds to the response time as currently perceived by the server 306). In addition, the method 500 sets the count field to five, indicating that a total of five initial TCP connection request packets, including the packet captured at $t_i$, have been sent to the server 306.

In another embodiment, if the method calculates Δt to be approximately thirty-six seconds in step 512, then in step 516, the method 500 sets start_time to start_time−9 seconds (e.g., essentially adding nine seconds to the response time as currently perceived by the server 306). In addition, the method 500 sets the count field to five, indicating that a total of five initial TCP connection request packets, including the packet captured at $t_i$, have been sent to the server 306.

In another embodiment, if the method calculates Δt to be approximately forty-two seconds in step 512, then in step 516, the method 500 sets start_time to start_time−3 seconds (e.g., essentially adding three seconds to the response time as currently perceived by the server 306). In addition, the method 500 sets the count field to five, indicating that a total of five initial TCP connection request packets, including the packet captured at $t_i$, have been sent to the server 306.

In another embodiment, if the method calculates Δt to be approximately forty-eight seconds in step 512, then in step 516, the method 500 sets start_time to start_time−45 seconds (e.g., essentially adding forty-five seconds to the response time as currently perceived by the server 306). In addition, the method 500 sets the count field to six, indicating that a total of six initial TCP connection request packets, including the packet captured at $t_i$, have been sent to the server 306.

In another embodiment, if the method calculates Δt to be approximately seventy-two seconds in step 512, then in step 516, the method 500 sets start_time to start_time−21 seconds (e.g., essentially adding twenty-one seconds to the response time as currently perceived by the server 306). In addition, the method 500 sets the count field to six, indicating that a total of six initial TCP connection request packets, including the packet captured at $t_i$, have been sent to the server 306.

In another embodiment, if the method calculates Δt to be approximately eighty-four seconds in step 512, then in step 516, the method 500 sets start_time to start_time−9 seconds (e.g., essentially adding nine seconds to the response time as currently perceived by the server 306). In addition, the method 500 sets the count field to six, indicating that a total of six initial TCP connection request packets, including the packet captured at $t_i$, have been sent to the server 306.

In another embodiment, if the method calculates $\Delta t$ to be approximately ninety seconds in step 512, then in step 516, the method 500 sets start_time to start_time−3 seconds (e.g., essentially adding three seconds to the response time as currently perceived by the server 306). In addition, the method 500 sets the count field to six, indicating that a total of six initial TCP connection request packets, including the packet captured at $t_i$, have been sent to the server 306.

In another embodiment, if the method calculates $\Delta t$ to be approximately ninety-six seconds in step 512, then in step 516, the method 500 sets start_time to start_time−93 seconds (e.g., essentially adding ninety-three seconds to the response time as currently perceived by the server 306). In addition, the method 500 sets the count field to seven, indicating that a total of seven initial TCP connection request packets, including the packet captured at $t_i$, have been sent to the server 306.

In another embodiment, if the method calculates $\Delta t$ to be approximately 144 seconds in step 512, then in step 516, the method 500 sets start_time to start_time−45 seconds (e.g., essentially adding forty-five seconds to the response time as currently perceived by the server 306). In addition, the method 500 sets the count field to seven, indicating that a total of seven initial TCP connection request packets, including the packet captured at $t_i$, have been sent to the server 306.

In another embodiment, if the method calculates $\Delta t$ to be approximately 168 seconds in step 512, then in step 516, the method 500 sets start_time to start_time−21 seconds (e.g., essentially adding twenty-one seconds to the response time as currently perceived by the server 306). In addition, the method 500 sets the count field to seven, indicating that a total of seven initial TCP connection request packets, including the packet captured at $t_i$, have been sent to the server 306.

In another embodiment, if the method calculates $\Delta t$ to be approximately 180 seconds in step 512, then in step 516, the method 500 sets start_time to start_time−9 seconds (e.g., essentially adding nine seconds to the response time as currently perceived by the server 306). In addition, the method 500 sets the count field to seven, indicating that a total of seven initial TCP connection request packets, including the packet captured at $t_i$, have been sent to the server 306.

In another embodiment, if the method calculates $\Delta t$ to be approximately 186 seconds in step 512, then in step 516, the method 500 sets start_time to start_time−3 seconds (e.g., essentially adding three seconds to the response time as currently perceived by the server 306). In addition, the method 500 sets the count field to seven, indicating that a total of seven initial TCP connection request packets, including the packet captured at $t_i$, have been sent to the server 306.

Once the method 500 has appropriately modified the start_time and count fields in step 516, the method 500 proceeds to step 518 and inquires if a TCP connection has been successfully established between the remote client 302 and the server 306. If a TCP connection has been established, the method 500 proceeds to step 520 and applies the modified settings calculated in step 516 to the server-measured response time, in order to produce a more accurate estimation of the client-perceived server response time. Thus, the start_ time field is properly set to the time associated with the transmission of the first initial TCP connection request packet sent from the client 302 to the server 306, and the count field represents the total number of initial TCP connection request packets transmitted from the client to the server. Alternatively, if the method 500 determines that a TCP connection has not been successfully established, the method 500 returns to step 502 and waits to capture a subsequent initial TCP connection request packet. The method 500 terminates in step 524.

In further embodiments, the method 500 could be applied to retransmission wait times exceeding 189 seconds in a similar manner. Although the present invention has been described within the context of systems implementing an exponential backoff mechanism that starts with a first retransmission wait time of three seconds and calculates each subsequent retransmission wait time as the double of the immediately preceding retransmission wait time, those skilled in the art will appreciate that embodiments of the present invention may be implemented in conjunction with alternative backoff schemes as well.

Moreover, those skilled in the art will appreciate that due to variance in round trip times (RTT) over time, $\Delta t$ will not always be exactly an integer value. In one embodiment, the method 500 is adapted to estimate an integer value for $\Delta t$. In one embodiment, this estimation is calculated using a tolerance of a few hundred milliseconds.

In other embodiments, the method 500 may be applied to determine client-perceived server response time in the event of a complete TCP connection establishment failure.

Figure 7:
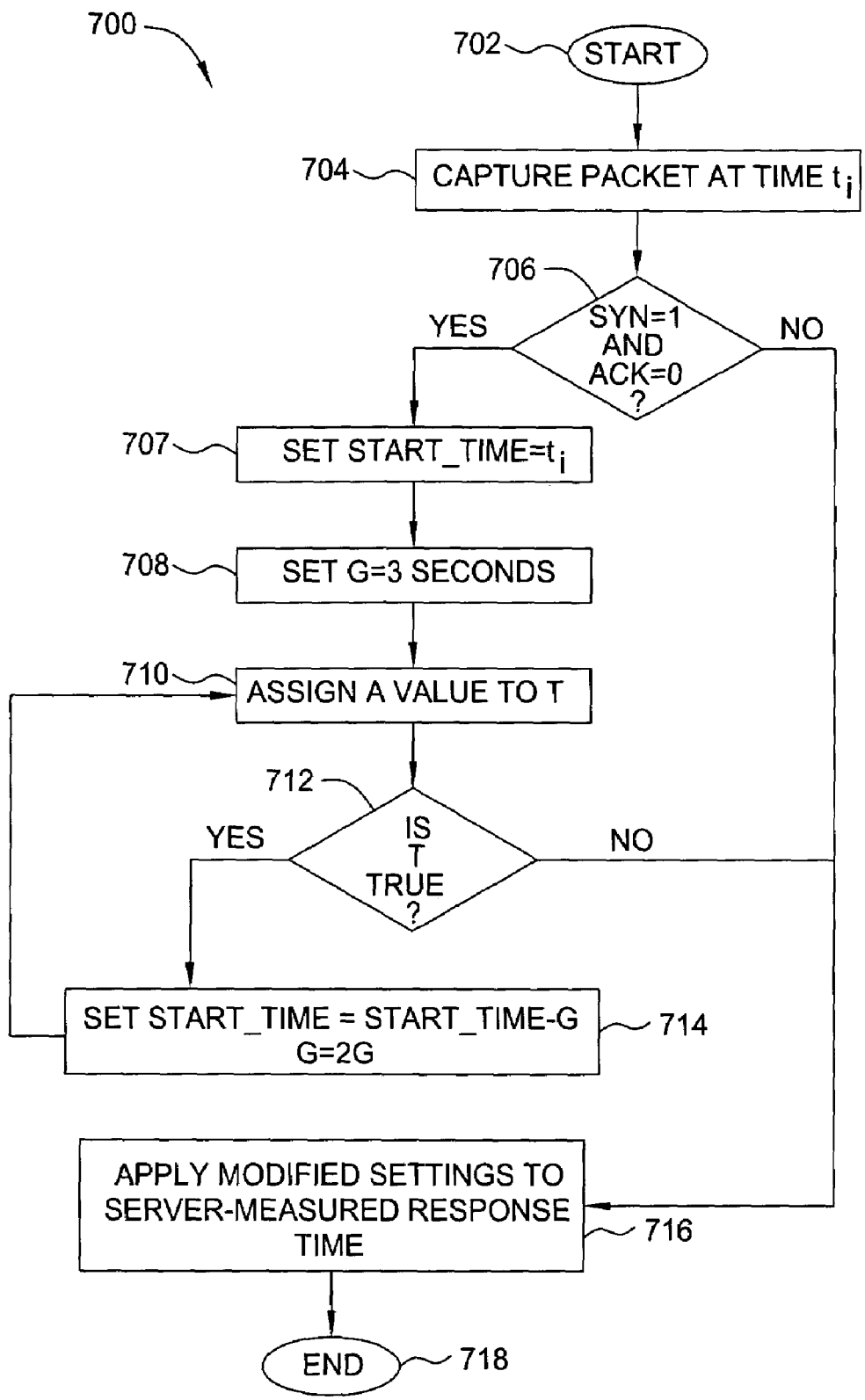
FIG. 7 is a flow diagram illustrating a second embodiment of a method for determining client-perceived server response time, according to the present invention.

FIG. 7 is a flow diagram illustrating a second embodiment of a method 700 for determining client-perceived server response time, according to the present invention. In one embodiment, the method 700, like the method 500, is adapted for determining client-perceived server response time where at least the first initial TCP connection request packet is dropped in the network before it can even be captured by the packet capture system 350 or the server 306. However, unlike the scenario addressed by the method 500, in which more than one subsequent initial TCP connection request packet is captured by the packet capture and analysis system 350, the scenario addressed by the method 700 presents a case in which only one subsequent initial TCP request packet is captured by the packet capture and analysis system 350. Thus, the existence of the first initial TCP connection request packet can not be inferred according to the method 500 described above.

The method 700 is initialized at step 702 and proceeds to step 704, where the method 700 captures an initial TCP connection request packet at time $t_i$. In step 706, the method 700 examines the header of the captured packet. Specifically, the method 700 asks whether TCP flags in the header are set to SYN=1 and ACK=0, indicating that the associated packet is an initial request packet for a TCP connection.

If the method 700 concludes in step 706 that the TCP flags in the header of the captured packet are set to SYN=1 and ACK=0, the method 700 proceeds to step 707 and sets the start_time field of the captured packet's flow object to $t_i$. The method 700 then proceeds to step 708 and sets G to three, where G is time added to the response time (e.g., the retransmission wait period). The method 700 then proceeds to step 710 and assigns a value to a random Boolean variable T. In step 712, the method 700 inquires if T is true. In one embodiment, T is true with a probability of x and false with a probability of 1−x, where x is a network packet loss probability between a client (e.g., a client 302) and the server (e.g., the server 306). If T is true, then the method 700 proceeds to step 714 and sets the start_time field of the relevant flow object to start_time−G. The method 700 also sets G to 2G. The method 700 then returns to step 710 and proceeds as described above.

Alternatively, if T is not true, the method 700 proceeds to step 716, where the method 700 applies modified settings to a server-measured response time. The method 700 also proceeds to step 716 if it is determined in step 706 that the captured packet is not an initial request packet for a TCP connection. In one embodiment, the method 700 modifies the server-perceived HTTP request start time for HTTP requests on this TCP connection to be the start time as indicated in the flow object of the captured packet, if the captured packet is determined to be the first HTTP request packet sent. In another embodiment, the method 700 modifies the server-perceived HTTP request start time for HTTP requests on this TCP connection to b the start time of the HTTP request as determined by the method 800, which is described in further detail below, if the captured packet is determined not to be the first HTTP request packet sent. The method 700 then terminates in step 718.

Figure 8:
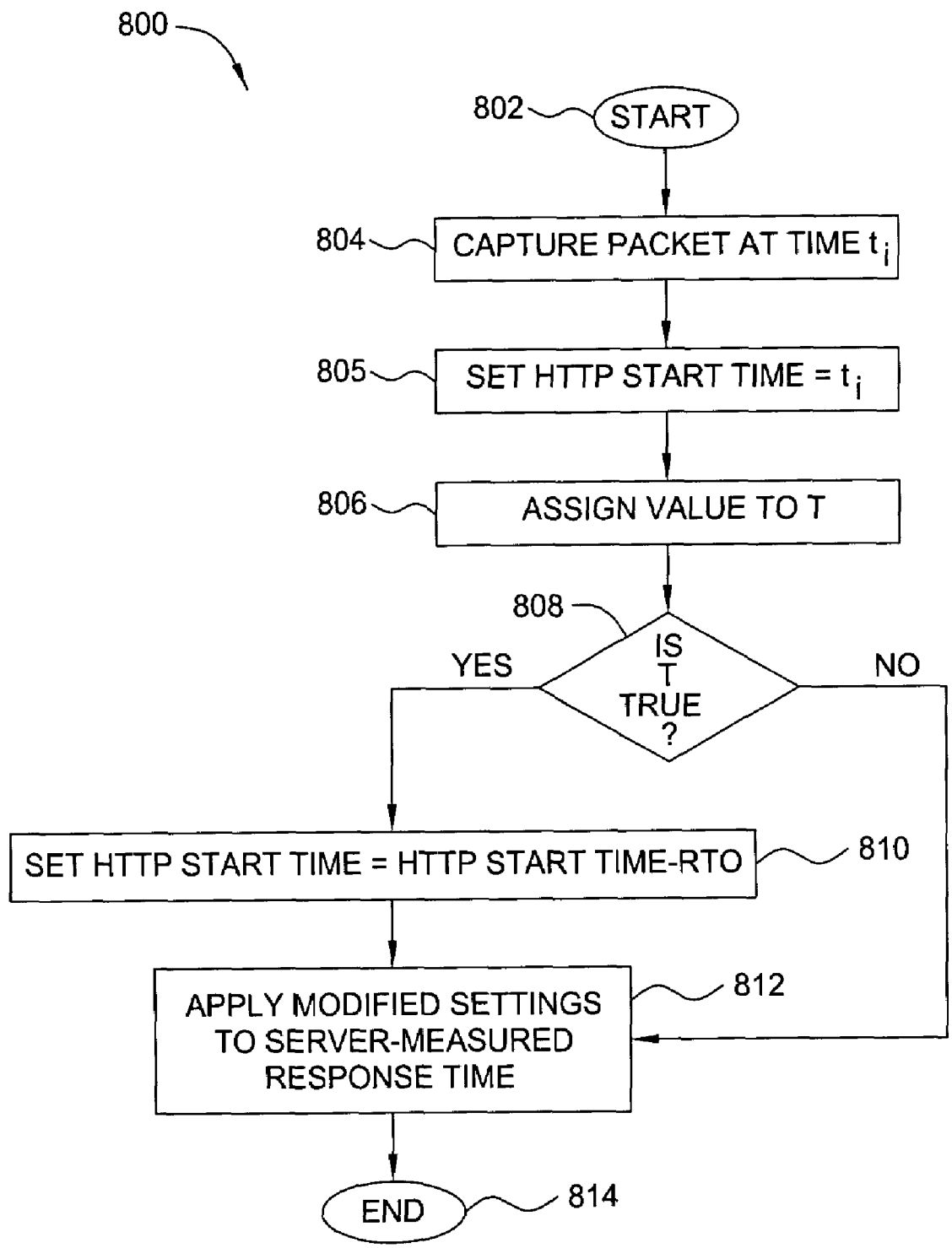
FIG. 8 is a flow diagram illustrating one embodiment of a method for determining client-perceived server response time in regard to an HTTP transaction, according to the present invention.

FIG. 8 is a flow diagram illustrating one embodiment of a method 800 for determining client-perceived server response time in regard to an HTTP transaction, according to the present invention. In one embodiment, the method 800 is adapted for determining client-perceived server response time where at least one first HTTP request packet is dropped in the network before it can even be captured by the packet capture system 350 or the server 306. Thus, the existence of the first HTTP request packet can not be inferred according to the method 500 described above.

The method 800 is initialized at step 802 and proceeds to step 804, where the method 800 captures an initial HTTP request packet at time $t_i$. The method 800 then proceeds to step 805 and sets a server-perceived start time for the associated HTTP request transaction (e.g., "HTTP START TIME") to $t_i$. This server-perceived start time may then be updated for accuracy, as described below.

In step 806, the method 800 assigns a value to a random Boolean variable T. In step 808, the method 800 inquires if T is true. In one embodiment, T is true with a probability of x and false with a probability of 1−x, where x is a network packet loss probability between a client (e.g., a client 302) and the server (e.g., the server 306). If T is true, then the method 800 proceeds to step 810 and sets the start time for the associated HTTP request transaction to HTTP START TIME−RTO, where RTO is the retransmission timeout value for the TCP connection.

In step 812, the method 800 applies the settings modified in step 810 to a server-measured response time (e.g., which will now account for the modified start time in calculating the response time). However, if the method 800 determines in step 808 that T is not true, the method 800 skips step 810 and proceeds directly to step 812. The method 800 then terminates in step 814.

Figure 9:
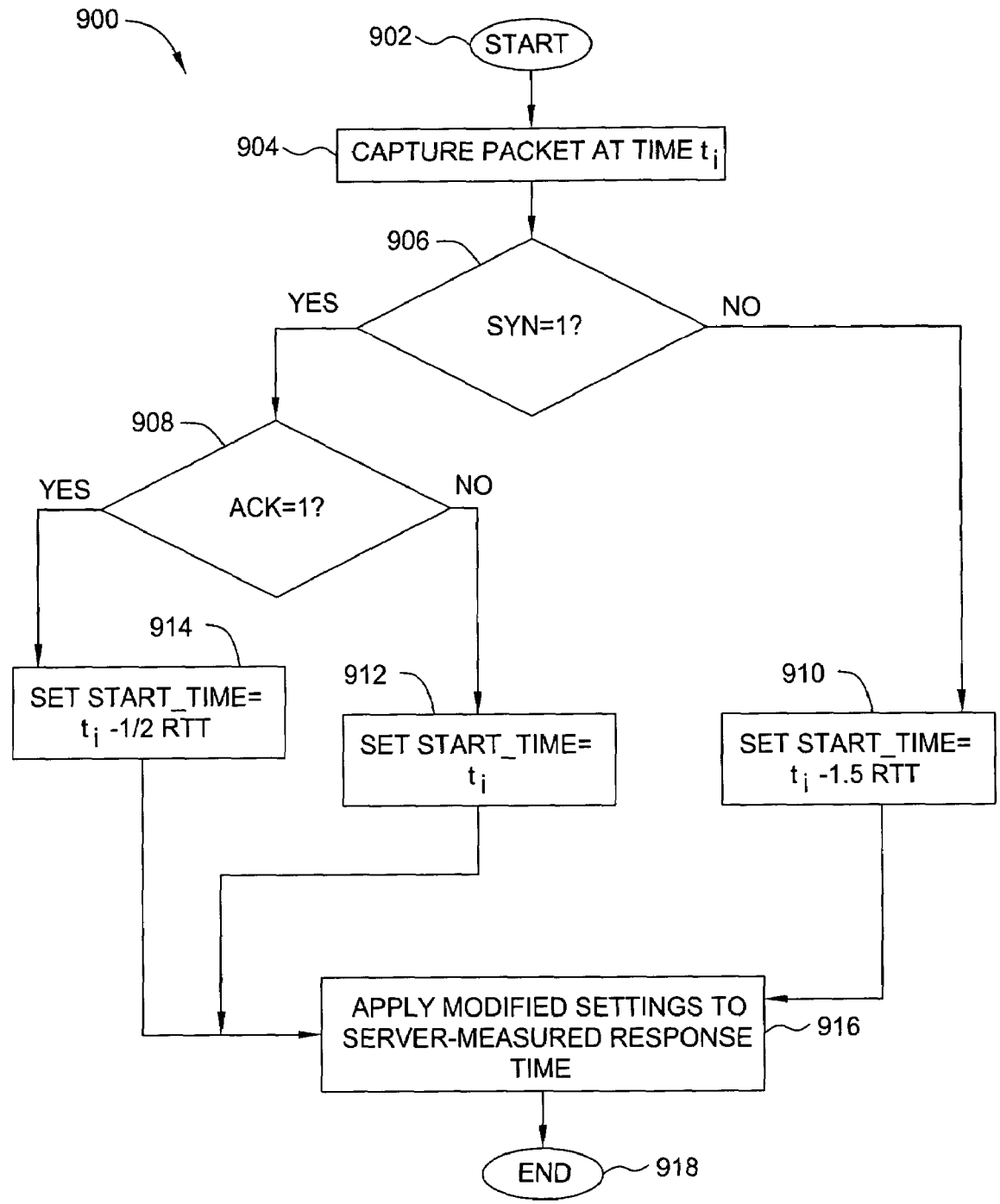
FIG. 9 is a flow diagram illustrating one embodiment of a method for determining client-perceived server response time in which a first plurality of packets sent between a client and a server are dropped in the network before they can be captured by a packet capture system.

FIG. 9 is a flow diagram illustrating one embodiment of a method 900 for determining client-perceived server response time in which a first plurality of packets (including TCP connection establishment packets and HTTP transfer packets) sent between a client 302 and the server 306 are dropped in the network 300 before they can even be captured by the packet capture system 350. Thus, the existence of the first plurality of packets can not be inferred according to the methods previously described.

The method 900 is initialized at step 902 and proceeds to step 904, where the method 800 captures an initial packet at time $t_i$. In step 906, the method 900 inquires if a flag in the captured packet's TCP header is set to SYN=1. If SYN=1, the method 900 proceeds to step 908 and inquires if another flag in the captured packet's TCP header is set to ACK=1. If ACK=1, the method 900 proceeds to step 914 and sets the start_time field of the associated flow object to $t_i$−½ RTT. Alternatively, if ACK is not equal to one, the method 900 proceeds to step 912, where the method 900 sets the start_ time field of the associated flow object to $t_i$.

If the method 900 concludes in step 906 that SYN is not equal to one, the method 900 assumes that the captured packet is an HTTP transfer packet and proceeds to step 910, where the method 900 sets the start_time field of the associated flow object to $t_i$−1.5 RTT.

In step 916, the method 900 applies the settings modified in steps 910, 912 or 914 to a server-measured response time. The method 900 then terminates in step 918.

Figure 10:
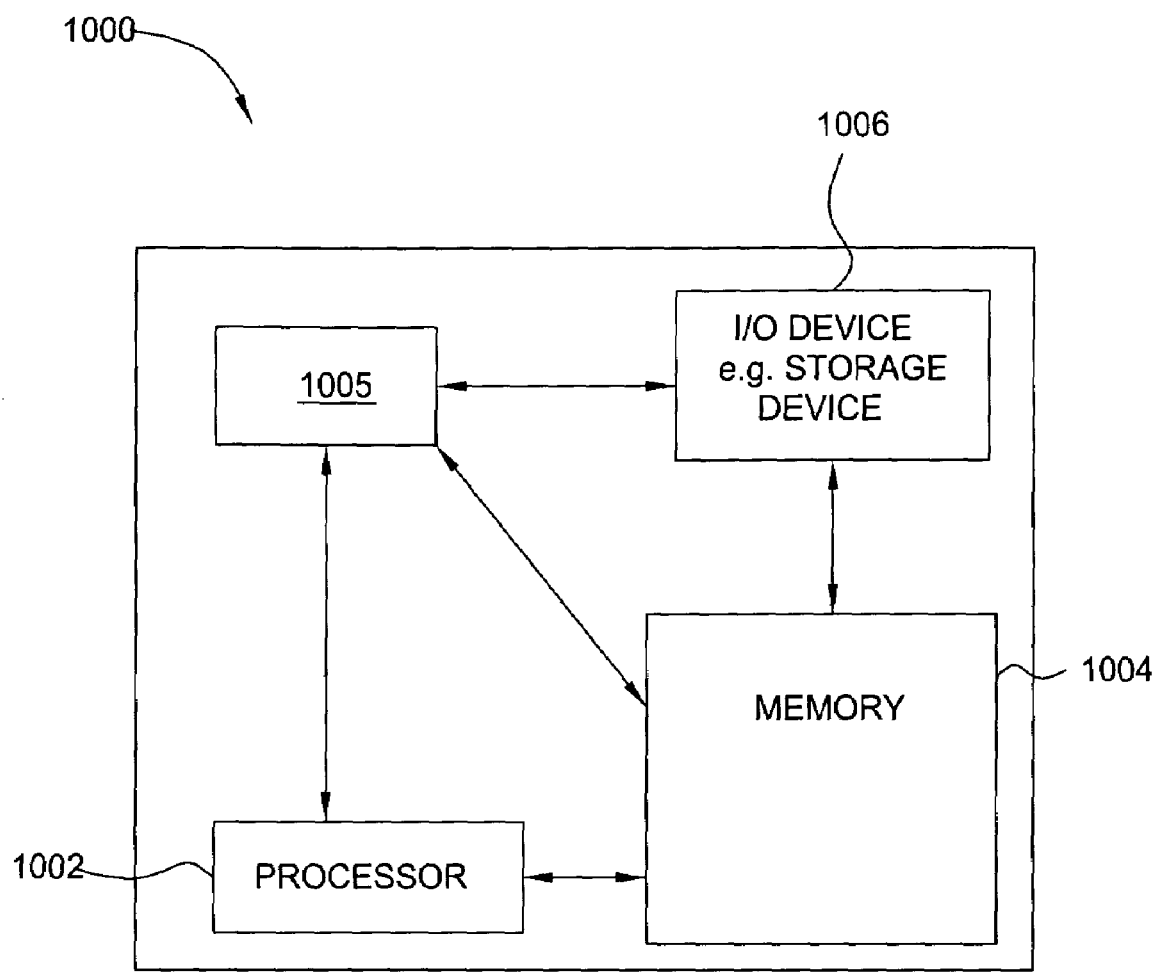
FIG. 10 is a high level block diagram of the present method for determining client-perceived server response time that is implemented using a general purpose computing device.

FIG. 10 is a high level block diagram of the present method for determining client-perceived server response time that is implemented using a general purpose computing device 1000. In one embodiment, a general purpose computing device 1000 comprises a processor 1002, a memory 1004, a packet capture and analysis module 1005 and various input/output (I/O) devices 1006 such as a display, a keyboard, a mouse, a modem, and the like. In one embodiment, at least one I/O device is a storage device (e.g., a disk drive, an optical disk drive, a floppy disk drive). It should be understood that the packet capture and analysis module 1005 can be implemented as a physical device or subsystem that is coupled to a processor through a communication channel.

Alternatively, the packet capture and analysis module 1005 can be represented by one or more software applications (or even a combination of software and hardware, e.g., using Application Specific Integrated Circuits (ASIC)), where the software is loaded from a storage medium (e.g., I/O devices 1006) and operated by the processor 1002 in the memory 1004 of the general purpose computing device 1000. Thus, in one embodiment, the packet capture and analysis module 1005 for determining client-perceived server response time described herein with reference to the preceding Figures can be stored on a computer readable medium or carrier (e.g., RAM, magnetic or optical drive or diskette, and the like).

Thus, the present invention represents a significant advancement in the field of computing network systems. A method and apparatus are provided that enable accurate, efficient assessments of client-perceived server response time, even in instances of packet loss. Performance of the server may thereby be more accurately measured, enabling efficient monitoring of service level agreements, client satisfaction, provisioning, and the like.

While foregoing is directed to the preferred embodiment of the present invention, other and further embodiments of the invention may be devised without departing from the basic scope thereof, and the scope thereof is determined by the claims that follow.

The invention claimed is:

1. A method for determining a client-perceived server response time for a transaction over a computing network, said method comprising:

capturing a copy of a first packet traversing the computing network between a client and a server, wherein said first packet is an initial transmission control protocol (TCP) connection request packet sent from said client to said server to request a TCP connection therebetween, and wherein said capturing step comprises:

analyzing data contained within said first packet to infer an existence of one or more dropped initial TCP connection request packets sent prior to said first packet, wherein said data is contained within a flow object, the flow object being a data structure having a plurality of fields that represent a TCP connection between said client and said server, said flow object being associated with said first packet, a first field of said plurality of fields indicating a number of initial TCP connection request packets which are captured or whose existence is inferred prior to capturing said first packet;

modifying a server-measured transaction start time to account for a first retransmission wait time associated with said first packet and for at least one second retransmission wait time associated with at least one earlier packet captured earlier in time relative to said first packet, wherein at least one of said first packet and said at least one earlier packet is dropped in said computing network or is dropped by said server; and determining a server-measured server response time in accordance with said server-measured transaction start time, as modified, so that said server-measured server response time is indicative of said client-perceived server response time.

2. The method of claim 1, wherein said first field of said plurality of fields indicates that no other initial TCP connection request packets have been captured or an existence of another initial TCP connection request packet has not been inferred prior to capturing said first packet.

3. The method of claim 2, wherein said modifying step comprises:

modifying said first field of said plurality of fields to indicate that one initial TCP connection request packet has been captured or an existence of one initial TCP connection request packet has been inferred;

modifying a second field of said plurality of fields to indicate that said first packet is a most recently captured initial TCP connection request packet;

modifying a third field of said plurality of fields to indicate that said transaction commenced at a time that said first packet was captured; and applying modifications made during said modifying to said server-measured server response time.

4. The method of claim 1, wherein said first field of said plurality of fields indicates that at least one initial TCP connection request packet has been captured or an existence of another initial TCP connection request packet has been inferred prior to capturing said first packet.

5. The method of claim 4, wherein said modifying step comprises:

calculating an amount of time that has elapsed between said capturing and a capture of an immediately prior initial TCP connection request packet.

6. The method of claim 5, further comprising the steps of:

modifying said first field of said plurality of fields to indicate a number of initial TCP connection request packets that are assumed to have been captured or that are assumed to have had their existence inferred based on said amount of time that has elapsed;

modifying a second field of said plurality of fields to indicate that said transaction commenced at a time that a prior packet was captured; and applying modifications made during said modifying to said server-measured server response time.

7. The method of claim 1, wherein said at least one earlier packet is an original packet, such that no other identical TCP connection packets are sent from said client to said server prior to said earlier packet.

8. The method of claim 7, wherein an original retransmission wait time is associated with said original packet, a duration of said original retransmission wait period increasing exponentially with each packet sent after said original packet.

9. The method of claim 8, wherein said original retransmission wait time is approximately three seconds.

10. The method of claim 8, wherein, if a cumulative number of TCP connection packets sent from said client to said server before said first packet does not exceed a predefined threshold, a length of time elapsed between a sending of said original packet and a sending of said first packet is assumed to be approximately equal to said original retransmission wait time multiplied by a first value associated with said cumulative number of TCP connection packets sent from said client to said server before said first packet.

11. The method of claim 10, wherein said first value is approximately equal to two, raised to said cumulative number, minus one.

12. The method of claim 11, wherein, if a total number of TCP connection packets sent from said client to said server including said first packet does not exceed said predefined threshold, a length of time elapsed between the sending of said original packet and the capturing of said first packet is assumed to be approximately equal to said original retransmission wait time multiplied by a second value associated with a total number of TCP connection packets sent from said client to said server including said first packet.

13. The method of claim 12, wherein said second value is approximately equal to two, raised to said total number, minus one.

14. The method of claim 13, wherein, if a period of time elapsed between the capturing of said first packet and a capture or an inferred existence of an immediately prior second packet is approximately equal to said total number minus said cumulative number, and a start time for a transaction commencing with the sending of said original packet is assumed to be approximately equal to a server-perceived start time minus said cumulative number.

* * * * *